United States Patent
Itani et al.

(10) Patent No.: US 8,341,409 B2
(45) Date of Patent: Dec. 25, 2012

(54) CONTENT SERVER APPARATUS, ON-VEHICLE PLAYER APPARATUS, SYSTEM, METHOD, AND PROGRAM

(75) Inventors: Satoru Itani, Osaka (JP); Yuji Mizuguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 865 days.

(21) Appl. No.: 12/064,763

(22) PCT Filed: Jun. 20, 2006

(86) PCT No.: PCT/JP2006/312296
§ 371 (c)(1),
(2), (4) Date: Feb. 25, 2008

(87) PCT Pub. No.: WO2007/023610
PCT Pub. Date: Mar. 1, 2007

(65) Prior Publication Data
US 2009/0132818 A1 May 21, 2009

(30) Foreign Application Priority Data

Aug. 26, 2005 (JP) .................. 2005-246665

(51) Int. Cl.
*H04L 9/32* (2006.01)
(52) U.S. Cl. .......... 713/169; 713/193; 713/201; 705/57; 705/59; 707/5; 380/201
(58) Field of Classification Search .......... 713/193, 713/169, 201; 709/217; 705/57, 59; 707/5; 380/201
See application file for complete search history.

(56) References Cited

U.S. PATENT DOCUMENTS 7,188,224 B2    3/2007 Ohta et al.
7,401,229 B2 *  7/2008 Ishidoshiro .................. 713/189
(Continued)

FOREIGN PATENT DOCUMENTS

EP    1 571 278    9/2005
(Continued)

OTHER PUBLICATIONS

Partial English translation of JP 2004-037981, which was cited in the IDS filed Feb. 25, 2008.

(Continued)

*Primary Examiner* — Jeffrey D Popham
*Assistant Examiner* — Gary Gracia
(74) *Attorney, Agent, or Firm* — Wenderoth, Lind & Ponack, L.L.P.

(57) ABSTRACT

A content server apparatus (10) includes: a unique information holding unit (103) which holds unique information of an on-vehicle player apparatus (20), a content obtaining unit (101) which obtains a content from outside, an encrypting unit (104) which encrypts the obtained content, prior to a transmission request from the on-vehicle player apparatus (20), onto an encrypted content using the unique information, a storing unit (105) which stores the encrypted content, and a transmitting unit (107) which transmits the stored encrypted content in response to the transmission request from the on-vehicle player apparatus (20). The on-vehicle player apparatus includes a storage medium (208) which stores the received encrypted content, and a decrypting unit (209) which decrypts the stored encrypted content in response to a reproduction request given from outside.

4 Claims, 5 Drawing Sheets

U.S. PATENT DOCUMENTS

| | | | | |
|---|---|---|---|---|
| 2001/0034714 | A1* | 10/2001 | Terao et al. | 705/57 |
| 2002/0046285 | A1* | 4/2002 | Yasushi et al. | 709/228 |
| 2002/0091848 | A1* | 7/2002 | Agresta et al. | 709/231 |
| 2002/0116082 | A1* | 8/2002 | Gudorf | 700/94 |
| 2002/0138442 | A1* | 9/2002 | Hori et al. | 705/59 |
| 2002/0152267 | A1* | 10/2002 | Lennon | 709/203 |
| 2003/0028660 | A1 | 2/2003 | Igawa et al. | |
| 2003/0032419 | A1* | 2/2003 | Shibasaki et al. | 455/419 |
| 2003/0043019 | A1* | 3/2003 | Tanaka et al. | 340/5.64 |
| 2004/0015249 | A1* | 1/2004 | Izumi et al. | 700/94 |
| 2004/0054678 | A1* | 3/2004 | Okamoto et al. | 707/100 |
| 2004/0078066 | A1* | 4/2004 | Ohta et al. | 607/60 |
| 2004/0078338 | A1 | 4/2004 | Ohta et al. | |
| 2004/0103303 | A1 | 5/2004 | Yamauchi et al. | |
| 2004/0117442 | A1* | 6/2004 | Thielen | 709/203 |
| 2004/0181613 | A1 | 9/2004 | Hashimoto et al. | |
| 2004/0230800 | A1 | 11/2004 | Futa et al. | |
| 2004/0249663 | A1* | 12/2004 | Shishido | 705/1 |
| 2004/0249759 | A1 | 12/2004 | Higashi et al. | |
| 2005/0027787 | A1* | 2/2005 | Kuhn et al. | 709/200 |
| 2005/0027984 | A1* | 2/2005 | Saito et al. | 713/168 |
| 2005/0086532 | A1* | 4/2005 | Lotspiech et al. | 713/201 |
| 2005/0091268 | A1* | 4/2005 | Meyer et al. | 707/103 R |
| 2005/0096005 | A1* | 5/2005 | Vinson et al. | 455/345 |
| 2005/0120232 | A1* | 6/2005 | Hori et al. | 713/193 |
| 2005/0120858 | A1* | 6/2005 | Fitzgerald et al. | 84/1 |
| 2005/0131885 | A1* | 6/2005 | Komatsu et al. | 707/3 |
| 2005/0138655 | A1* | 6/2005 | Zimler et al. | 725/32 |
| 2005/0154795 | A1* | 7/2005 | Kuz et al. | 709/227 |
| 2005/0179531 | A1* | 8/2005 | Tabe | 340/447 |
| 2005/0192902 | A1* | 9/2005 | Williams | 705/51 |
| 2005/0198322 | A1* | 9/2005 | Takabayashi et al. | 709/228 |
| 2005/0234907 | A1* | 10/2005 | Yamagishi et al. | 707/5 |
| 2005/0245241 | A1* | 11/2005 | Durand et al. | 455/414.1 |
| 2006/0026067 | A1* | 2/2006 | Nicholas et al. | 705/14 |
| 2006/0031502 | A1* | 2/2006 | Yoshimine et al. | 709/225 |
| 2006/0045015 | A1* | 3/2006 | Nix et al. | 370/235 |
| 2006/0048202 | A1* | 3/2006 | Bontempi et al. | 725/118 |
| 2006/0058046 | A1* | 3/2006 | Matsuura et al. | 455/457 |
| 2006/0059101 | A1* | 3/2006 | Ebihara et al. | 705/59 |
| 2006/0059535 | A1* | 3/2006 | D'Avello | 725/139 |
| 2006/0092037 | A1* | 5/2006 | Neogi et al. | 340/825.22 |
| 2006/0095396 | A1* | 5/2006 | Ostrover | 707/1 |
| 2006/0149683 | A1* | 7/2006 | Shimojima et al. | 705/59 |
| 2006/0184969 | A1* | 8/2006 | Yamamoto et al. | 725/58 |
| 2006/0212531 | A1* | 9/2006 | Kikkawa et al. | 709/217 |
| 2006/0218604 | A1* | 9/2006 | Riedl et al. | 725/91 |
| 2006/0277584 | A1* | 12/2006 | Taylor | 725/112 |
| 2007/0005503 | A1* | 1/2007 | Engstrom et al. | 705/59 |
| 2007/0094276 | A1* | 4/2007 | Isaac | 707/100 |

FOREIGN PATENT DOCUMENTS

| | | |
|---|---|---|
| JP | 08-069419 | 3/1996 |
| JP | 2002-24711 | 1/2002 |
| JP | 2002-73861 | 3/2002 |
| JP | 2002-305548 | 10/2002 |
| JP | 2003-044384 | 2/2003 |
| JP | 2003-83752 | 3/2003 |
| JP | 2004-037981 | 2/2004 |
| JP | 2004-048540 | 2/2004 |
| JP | 2004-101248 | 4/2004 |
| JP | 2004-102415 | 4/2004 |
| JP | 2004-104270 | 4/2004 |
| JP | 2004-110816 | 4/2004 |
| JP | 2004-110817 | 4/2004 |
| JP | 2004-112788 | 4/2004 |
| JP | 2004-145867 | 5/2004 |
| JP | 2004-151778 | 5/2004 |
| JP | 2004-185456 | 7/2004 |
| JP | 2004-196154 | 7/2004 |
| JP | 2004-248056 | 9/2004 |
| JP | 2004-272662 | 9/2004 |
| JP | 2004-334860 | 11/2004 |
| JP | 2004-340884 | 12/2004 |
| JP | 2005-128005 | 5/2005 |
| WO | 2004/055302 | 7/2004 |
| WO | 2004/092864 | 10/2004 |
| WO | 2004/111880 | 12/2004 |

OTHER PUBLICATIONS

International Search Report issued Aug. 15, 2006 in the International (PCT) Application of which the present application is the U.S. National Stage.

* cited by examiner

| Name of content | Date of record | Person recorded | Program watched? |
|---|---|---|---|
| A (1 of 3) | 2005/08/10 | Father | Watched |
| A (2 of 3) | 2005/08/10 | Father | Not watched |
| A (3 of 3) | 2005/08/10 | Father | Not watched |
| B | 2005/08/02 | Elder brother | Watched |
| C | 2005/07/28 | Mother | Not watched |
|  |  |  |  |

CONTENT SERVER APPARATUS, ON-VEHICLE PLAYER APPARATUS, SYSTEM, METHOD, AND PROGRAM

TECHNICAL FIELD

The present invention relates to a content server apparatus, an on-vehicle player apparatus, and a system configured thereof, and particularly to a technique for rapid transmission of digital content requiring copyright protection, from the content server apparatus to the on-vehicle player apparatus.

BACKGROUND ART

Conventionally, it is common practice to store favorite music in a storage medium such as a Compact Disc (CD) and a Mini Disc (MD) and bring the medium into a vehicle for enjoying in the vehicle when going for a drive or driving to and from work, for example.

An information searching and reproduction system which supports more convenient music listening in a vehicle is disclosed in Patent Reference 1, for example. The information searching and reproduction system includes a home server and an on-vehicle terminal, which are connected wirelessly. The on-vehicle terminal browses a list of songs in the home server and obtains a desired song from the home server, via wireless means, and then reproduces the obtained song.

Since the above structure can dispense with the storing of media for bringing favorite music into a vehicle, the space for storing the storage medium and the trouble in transporting the media are saved, and convenience to a user significantly improves. [Patent Reference 1] Japanese Unexamined Patent Application Publication No. 2004-37981.

DISCLOSURE OF INVENTION

Problems that Invention is to Solve

However, there is a problem in the conventional information searching and reproduction system that protection of copyrights is not considered when transmitting music (or digital content, in a broader sense). This problem is especially serious since the demand for the protection of copyrights in digital contents is rapidly increasing at present.

The present invention is conceived to in view of the above problem, and has as an object to provide: a content server apparatus which transmits a digital content speedily from a content server apparatus to an on-vehicle player apparatus while protecting copyrights; the on-vehicle player apparatus; and a system configured thereof.

Means to Solve the Problems

In order to solve the above problems, a content server apparatus of the present invention is a content server apparatus used with an on-vehicle player apparatus and includes: a unique information holding unit which holds unique information of the on-vehicle player apparatus; a content obtaining unit which obtains a content from outside of the content server; an encrypting unit which encrypts the obtained content into an encrypted content, using the unique information, prior to a transmission request from the on-vehicle player apparatus; a storing unit which stores the encrypted content; and a transmitting unit which transmits the stored encrypted content to the on-vehicle player apparatus in response to the transmission request from the on-vehicle player apparatus.

Further, the unique information holding unit may secretly hold, as the unique information, identification information which is unique to a storage medium for storing the encrypted content in the on-vehicle player apparatus.

Moreover, the content server apparatus may further include a communication unit which connects to at least one of a Local Area Network (LAN), the Internet, and a mobile communication network. The transmitting unit may transmit the encrypted content to the on-vehicle player apparatus via at least one of the LAN, the Internet, and the mobile communication network, using the communication unit.

According to this structure, the content server apparatus encrypts the obtained content, using unique information of the on-vehicle player apparatus, thereby making the content into an encrypted content which cannot be reproduced on another player apparatus, stores the encrypted content, and then transmits the stored encrypted content to the on-vehicle player apparatus. By doing so, acts of copying the encrypted content onto another player apparatus become irrelevant, contributing a level of copyright protection.

In addition, the content server apparatus encrypts and stores the content in advance prior to the transmission request from the on-vehicle player apparatus, so the content server apparatus can immediately transmit the encrypted content, in response to the transmission request, from the on-vehicle player apparatus. Since the content has been encrypted in advance, overhead for the encryption during transmission is omitted, and turnaround time for the transmission process is shortened. Thus, a significant effect can be achieved; that is, a large content can be transmitted from the content server apparatus to the on-vehicle player apparatus within a short period of time, such as just before leaving home.

In particular, in the case where the storage medium, which stores the encrypted content in the on-vehicle player apparatus, complies with the Content Protection for Recordable Media (CPRM) standard, by secretly holding a media key which is actually used as an encryption key as an example of identification information unique to the storage medium, the on-vehicle player apparatus can be easily implemented.

In addition, the content obtaining unit may obtain the content in the form of at least one of an analog signal representing the content and digital data that is obtained by performing predetermined encoding on the analog signal. Further, the content server apparatus may include an encoding unit which, in the case where the content is obtained in the form of an analog signal, encodes the obtained analog signal into digital data.

According to this structure, content represented in various forms can be obtained. In particular, in the structure including the encoding unit, a content in the analog signal can be converted into digital data to which a technique of copyright protection can be applicable.

Moreover, the content server apparatus may further include an authenticating unit which authenticates the on-vehicle player apparatus prior to transmission of the encrypted content. The transmitting unit may transmit the encrypted content to the on-vehicle player apparatus only when the authentication by the authenticating unit is successful. In addition, the authenticating unit and the on-vehicle player apparatus may each hold device certificate data which is based on Digital Transmission Content Protection (DTCP), and the authenticating unit and the on-vehicle player apparatus may perform mutual authentication, using the device certificate data.

According to this structure, the content is not transmitted unless the authentication is successful, which provides further protection to the content. Furthermore, the structure utilizing the device certificate data increases reliability of the authentication.

Moreover, the content server apparatus may further include a metadata storing unit which stores metadata each corresponding to one of encrypted contents stored in the storing unit. The transmitting unit may transmit the encrypted content in an order designated by the metadata. In addition, the content server apparatus may be notified of a car occupant who is identified by the on-vehicle player apparatus, the metadata may include information for identifying an individual, and the transmitting unit may transmit, prior to any other encrypted content, an encrypted content which corresponds to the metadata identifying the car occupant which is notified by the on-vehicle player apparatus.

According to this structure, a content which is expected to be much-needed based on the meta data can be transmitted with a high priority, thus convenience of the user increases. In particular, the structure which determines the transmission order of the contents, utilizing the car occupant, is useful for preferentially transmitting an appropriate content with high accuracy.

Moreover, the storing unit may divide the encrypted content into plural fragments and store the fragments, and the transmitting unit may transmit the encrypted content to the on-vehicle player apparatus on the stored fragment basis.

According to this structure, in the case where there is no time to successfully transmit the whole content, especially a large content, the content is transmitted on the fragment basis. Thus it is possible to expect the convenience of being able to view even just the fragments of the content that have been successfully transmitted, on the on-vehicle player apparatus.

In order to solve the above problems, the on-vehicle player apparatus is used with the content server apparatus and includes: a requesting unit which requests, to the content server apparatus, transmission of the encrypted content which is encrypted using unique information of the on-vehicle player apparatus; a receiving unit which receives the encrypted content which has been transmitted from the content server apparatus in response to the request; a storage medium for storing the received encrypted content; and a decrypting unit which decrypts the stored encrypted content using the unique information, in response to a reproduction request given from outside.

The on-vehicle player apparatus may further include a communication unit which connects to at least one of a Local Area Network, the Internet, and a mobile communication network. The receiving unit may receive the encrypted content from the content server apparatus via at least one of the LAN, the Internet, and the mobile communication network, using the communication unit.

According to this structure, the on-vehicle player apparatus can obtain, from the content server apparatus, the prospectively encrypted content. Since the content has been encrypted in advance, overhead for the encryption during transmission is omitted, and turnaround time for the transmission process is shortened. Thus, a significant effect can be achieved; that is, a large content can be transmitted from the content server apparatus to the on-vehicle player apparatus within a short period of time, such as just before leaving home.

Furthermore, the encrypted content has been encrypted, using the unique information of the on-vehicle player apparatus, in order not to be reproduced on another player device. By doing so, acts of copying the encrypted content onto another player apparatus become irrelevant, contributing a level of copyright protection.

Moreover, the requesting unit may issue the request in one or more of the cases where: the on-vehicle player apparatus is activated; a predetermined operation is performed by the user; and a predetermined time has elapsed since the previous request.

According to this structure, it is very convenient since before leaving home, for example, the on-vehicle player apparatus is activated upon the start of the engine of a vehicle, and the obtainment of the content from the content server apparatus is activated automatically. After that, the content is automatically obtained when the user requests and according to the elapse of a time, thus, significant convenience is provided.

The on-vehicle player apparatus may further comprise a car occupant identifying unit which identifies a car occupant. The requesting unit may notify the content server apparatus of the identified car occupant, when issuing the request.

According to this structure, the on-vehicle player apparatus, in cooperation with the content server, transmits a relevant content in advance before other contents, and a content which is expected to be much-needed is preferentially obtained. Thus, convenience of the user increases.

In addition, the on-vehicle player apparatus may further include an authenticating unit which authenticates the content server apparatus prior to reception of the encrypted content. The receiving unit may receive the encrypted content from the content server apparatus only when the authentication by the authenticating unit is successful. Furthermore, the authenticating unit and the content server apparatus may mutually hold device certificate data based on the DTCP, and the authenticating unit and the content server apparatus may perform mutual authentication, using the device certificate data.

According to this structure, the content is not transmitted unless the authentication is successful. Furthermore, the structure utilizing the device certificate data increases reliability of the authentication.

Moreover, the receiving unit may receive the encrypted content in fragments each of which is transmitted from the content server. The storage medium may store the encrypted content on the received fragment basis, and the decrypting unit may perform the decryption on the stored fragment basis, regardless of whether or not all fragments of the encrypted content have been stored.

According to this structure, in the case where there is no time to successfully transmit the whole content, especially a large content, the content is transmitted in fragments. Thus it is possible to expect the convenience of being able to watch, on the on-vehicle player apparatus, even just the fragments that have been successfully transmitted.

Note that the present invention can not only be implemented as the content server apparatus and the on-vehicle player apparatus, but also be implemented as: a content server player system configured of the content server apparatus and the on-vehicle player apparatus; a method utilizing processing to be executed by characteristic structural elements included in the apparatus and system as steps; and a program causing a computer to execute those steps.

Effects of the Invention

In the content server apparatus, the on-vehicle player apparatus, and the content server-player system configured thereof, of the present invention, the content server apparatus encrypts a content, using unique information of the on-vehicle player apparatus, thereby making the content into an encrypted content which cannot be reproduced on another player apparatus, stores the encrypted content, and then transmits the stored encrypted content to the on-vehicle player apparatus.

By doing so, acts of copying the encrypted content onto another player apparatus become irrelevant, contributing a level of copyright protection. Moreover, since the transmitted content has been encrypted in advance, overhead for the encryption during transmission is omitted, and turnaround time for the transmission process is shortened.

NUMERICAL REFERENCES

Figure 1:
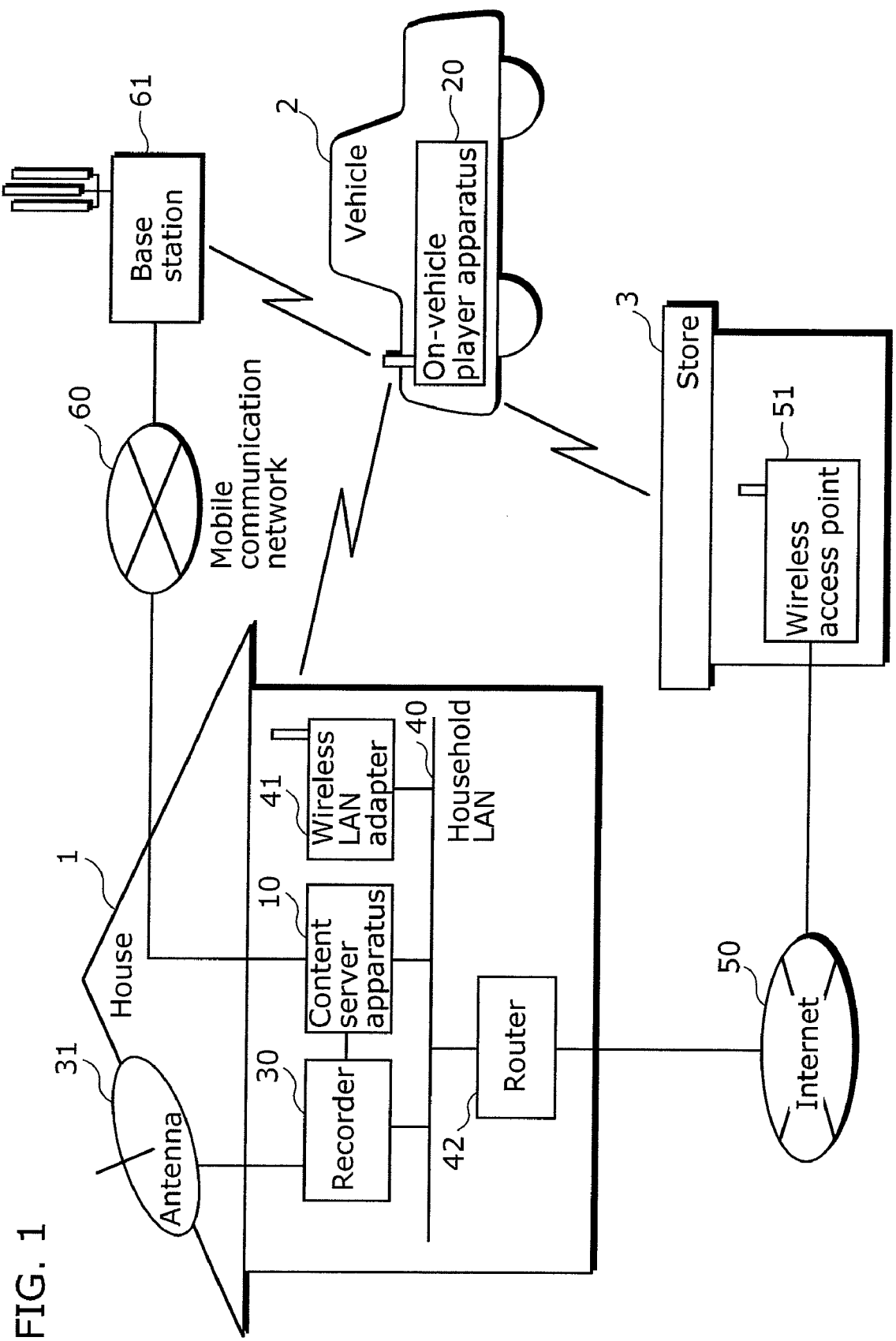
FIG. 1 is a conceptual diagram showing an example of the overall configuration of a content server-player system according to an embodiment of the present invention.

1 House
2 Vehicle
3 Store
10 Content server apparatus
20 On-vehicle player apparatus
30 Recorder
31 Antenna
40 Household LAN
41 Wireless LAN adapter
42 Router
50 The Internet
51 Wireless access point
60 Mobile communication network
61 Base station
101 Content obtaining unit
102 Encoding unit
103 Unique information holding unit
104 Encrypting unit
105 Storing unit
106 Metadata storing unit
107 Transmitting unit
108 Communication I/F
109 Authenticating unit
201 Timer unit
202 Operation accepting unit
203 Car occupant identification unit
204 Requesting unit
205 Communication I/F
206 Authenticating unit
207 Receiving unit
208 Storage medium
209 Decrypting unit
210 Decoding unit
211 Unique information holding unit

BEST MODE FOR CARRYING OUT THE INVENTION

A content server apparatus, an on-vehicle player apparatus, and a content server-player system configured thereof, according to an embodiment of the present invention, are described with reference to the drawings.

(System Configuration)

FIG. 1 is a conceptual diagram showing an example of the overall configuration of the content server-player system in the embodiment.

This content server-player system, in which a content server apparatus 10 located in a house 1 encrypts a content, using unique information of an on-vehicle player apparatus 20 equipped in a vehicle 2, so that the content becomes an encrypted content to store, then stores the encrypted content, and transmits the stored encrypted content in response to a request from the on-vehicle player apparatus 20. The content server apparatus 10 and the on-vehicle player apparatus 20 are connected via a household LAN 40, the Internet 50, and a mobile communication network 60 to make communication possible. The communication via the mobile communication network 60 can be performed, for example, using circuit switching services and packet switching services provided for a personal terminal apparatus such as a cellular phone. Moreover, it goes without saying that in a garage of the house 1, for example, the content server apparatus 10 and the on-vehicle player apparatus 20 can also be directly connected without going through the household LAN 40.

A recorder 30 records the content at the house 1. The content to be recorded is, for example, a broadcasted program accepted with an antenna 31, video filmed using a household-use camcorder, a content obtained via the Internet, and a content obtained from a storage medium.

The content server apparatus 10 obtains the recorded content directly from the recorder 30 or via the household LAN 40, encrypts the content thereby making it into an encrypted content, using the unique information of the on-vehicle player apparatus 20, and stores the encrypted content. The content to be obtained can be in the form of either an analog signal or encoded digital data. A content obtained in the form of the analog signal is encoded to become digital data by the content server apparatus 10, and then encrypted to become encrypted content.

For example, in the case where the vehicle 2 is in the garage of the house 1, the on-vehicle player apparatus 20 obtains the encrypted content from the content server apparatus 10 directly or via the household LAN 40, by connecting wirelessly to a wireless LAN adapter 41 or by connecting to the household LAN 40 or directly to the content server device 10 itself using a cable that is not shown in the figure.

For example, in the case where the vehicle 2 is in a parking lot of a store 3 which provides a wireless access point 51, the on-vehicle player apparatus 20 establishes wireless connection with the wireless access point 51, and obtains the encrypted content from the content server apparatus 10 via the Internet 50, a router 42, and the household LAN 40.

For example, in the case where the vehicle 2 is moving, the on-vehicle player apparatus 20 establishes wireless connection with a base station 61 of a mobile phone system, and obtains the encrypted content from the content server apparatus 10 via the mobile communication network 60.

The on-vehicle player apparatus 20 may appropriately, automatically select an available communication method among the above-mentioned methods for obtaining the encrypted content.

(Structure of the Content Server Apparatus 10 and the on-Vehicle Player Apparatus 20)

Next, details of the content server apparatus 10 and the on-vehicle player apparatus 20 are described.

Figure 2:
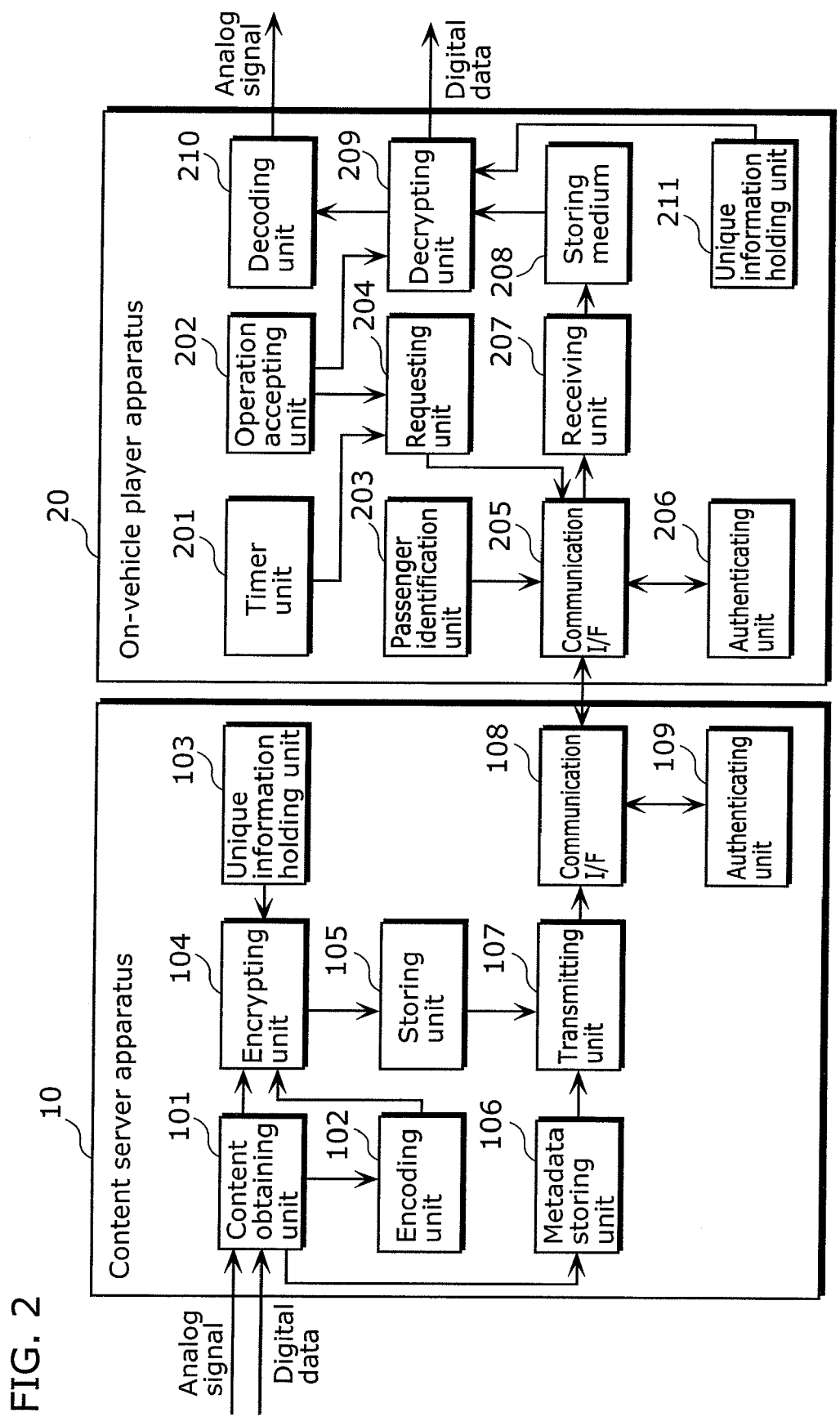
FIG. 2 is a block diagram showing an example of a functional configuration of a content server apparatus and an on-vehicle player apparatus.

FIG. 2 is a block diagram which shows an example of the functional configuration of the content server apparatus 10 and the on-vehicle player apparatus 20.

The content server apparatus 10 includes: a content obtaining unit 101; an encoding unit 102; a unique information holding unit 103; an encrypting unit 104; a storing unit 105; a metadata storing unit 106; a transmitting unit 107; a communication I/F (interface) 108; and an authenticating unit 109.

The content obtaining unit 101 obtains the content in the form of an analog signal or digital data from the recorder 30 shown in FIG. 1.

The encoding unit 102 encodes the content obtained in the form of the analog signal into digital data. For this encoding, a conventional technique such as the MPEG (Moving Picture Expert Group)-2 can be used.

The unique information holding unit 103 holds the unique information of the on-vehicle player apparatus 20 which has been preset. In the case where a storage medium 208 in the on-vehicle player apparatus 20 complies with the CPRM standard, the unique information holding unit 103 may secretly hold, as the unique information, a media key which is the unique identification information of the storage medium 208.

In the case where there are two or more on-vehicle player apparatuses 20 which are used with the content server apparatus 10, the unique information holding unit 103 holds unique information on each of the on-vehicle player apparatuses. It is preferable that the unique information holding unit 103 accepts and holds the unique information only under a safe environment such as, for example, a shipment stage at a factory and a set-up stage at an outlet during the purchase of the content server apparatus 10, and the purchase or additional installation of the on-vehicle player apparatus 20.

Using the unique information held in the unique information holding unit 103, the encrypting unit 104 encrypts, into an encrypted content, the content obtained by the content obtaining unit 101 and encoded by the encoding unit 102 into the form of digital data.

The encrypting unit 104 may judge protection of copyrights as being necessary and perform this encryption only when the obtained analog signal and digital data include a copy management signal or copy management information. In such a case, a content without the copy management signal, such as the video filmed using the household-use camcorder, is directly outputted without encryption.

Together with encrypting the content into the encrypted content, using a title key for each content, the encrypting unit 104 may: encrypt the title key into an encrypted title key, using the unique information; and output the encrypted content and the encrypted title key as a pair. Since the CPRM standard, for example, is widely known as a specific method for such encryption, here, description is not given in detail. For the sake of simplification, the pair of the encrypted content and the encrypted title key is also referred to as the encrypted content hereinafter.

The storing unit 105 stores the content which has been outputted from the encrypting unit 104. The content is one of an encrypted content and a content in plaintext depending on the judgment of the necessity of copyright protection.

The storing unit 105 stores a particularly large content by performing predetermined division on the content and using, for example, individual files for each of the obtained fragments.

By dividing and storing a large content, and then transmitting on the fragment basis in the case where there is no time to successfully transmit the whole content, it is possible to expect the convenience of being able to watch, on the on-vehicle player apparatus 20, even just the fragments that have been successfully transmitted.

Figure 3:
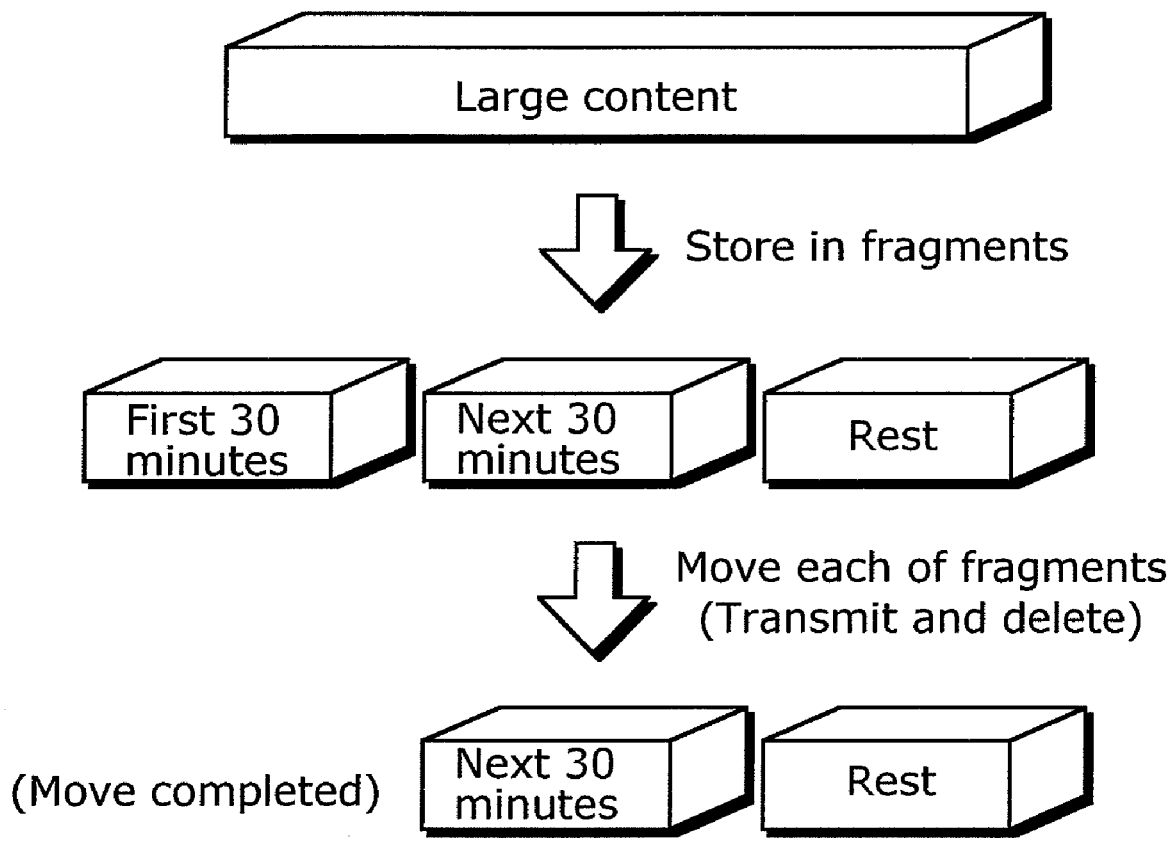
FIG. 3 is a conceptual diagram which describes storing and moving of a content in fragments.

FIG. 3 is a conceptual diagram describing storing and moving of the content in fragments. As commonly known, moving stands for an operation which deletes a content that has been successfully transmitted from the point of content copyright protection.

This example schematically describes a typical situation in which a particularly large content of which reproduction time exceeds one hour, for example, is divided into three fragments; namely, the first thirty minutes, the next thirty minutes, and the rest; and furthermore, the first fragment is successfully transmitted to the on-vehicle player apparatus 20 by a move on the divided fragment basis; and the transmitted first fragment is deleted from the content server apparatus 10. The successfully moved first fragment can be viewed on the on-vehicle player apparatus 20. Here, the unit time for division of 30 minutes is just an example, and may be much shorter for actual use.

The metadata storing unit 106 stores the metadata of respective contents stored in the storing unit 105. For example, the metadata may be originally stored in the recorder 30 shown in FIG. 1, obtained by the content obtaining unit 101 together with a pre-encryption content, and stored in the metadata storing unit 106. The metadata is referred to in order to determine a transmission order of contents, in the transmitting unit 107.

Figure 4:
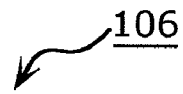
FIG. 4 is a diagram which shows one example of metadata for managing a transmission order of a content.

FIG. 4 shows an example of the metadata stored in the metadata storing unit 106. The metadata in this example shows, for each content (each divided fragment when the content is divided and stored), the content name, the recording date, the recording person, and whether viewed or not.

Here, each item in the metadata is either: a copy of information which the recorder 30 manages based on operations related to recording and viewing received from the user; or information which is derived from the aforementioned information. For example, in the case where the recorder 30 manages, for each content, information which shows the recording date, the recording person, and the already viewed on per minute basis, the metadata is generated out of such information.

Furthermore, for the sake of simplification, the metadata corresponding to a content which is transmitted to the on-vehicle player apparatus 20, is deleted together with the content. On the contrary, a content having metadata is not transmitted yet and is still stored in the storing unit 105.

Upon receiving a transmission request from the on-vehicle player apparatus 20, first, the transmitting unit 107 refers to the metadata stored in the metadata storing unit 106 and determines the transmission order of the contents. As an example, the transmitting unit 107 may determine the transmission order in the order of latest recording date for contents which have not been viewed, and then, in the order of latest recording date for contents which have been viewed. Furthermore, when information which identifies a car occupant is notified from the on-vehicle player apparatus 20 during the transmission request, it is preferable that the transmission order of a content for which the car occupant is the recording person should be ahead of other contents.

Next, in accordance with the transmission order determined above, the transmitting unit 107 retrieves the content which has been stored in the storing unit 105 and transmits the content to the on-vehicle player apparatus 20 via the communication I/F 108. Then, upon successful completion of transmission of each content (each fragment in the case where the content is divided and stored), the content or the divided fragment, along with the corresponding metadata, is deleted.

The communication I/F 108 establishes communication with the on-vehicle player apparatus 20, via the household LAN and the mobile communication network 60 shown in FIG. 1. To be more specific, the communication I/F 108 can be implemented using the Network Interface Controller (NIC), a modem, and the like. All the communication with the on-vehicle player apparatus 20, including the reception of the transmission request, the content transmission, and authentication of the on-vehicle player apparatus 20 described below, is carried out via the communication I/F 108.

The authenticating unit 109 authenticates the on-vehicle player apparatus 20 prior to the content transmission. As an example, the authenticating unit 109, along with an authenticating unit 206 in the on-vehicle player apparatus 20, may hold and mutually authenticate DTCP-based certification data of the respective apparatuses.

The on-vehicle player apparatus 20 includes a timer unit 201, an operation accepting unit 202, a car occupant identification unit 203, a requesting unit 204, a communication I/F 205, the authenticating unit 206, a receiving unit 207, the storage medium 208, a decrypting unit 209, a decoding unit 210, and a unique information holding unit 211.

The timer unit 201 times a time interval for performing the transmission request for the content.

The operation accepting unit 202 receives a directive operation which is performed on the on-vehicle player apparatus 20 by the user, such as a content obtainment directive operation and a directive operation for the reproduction of an obtained encrypted content, for example. Specifically, the operation accepting unit 202 is implemented using a mechanical switch, a touch panel, a remote control receiver and the like.

The car occupant identification unit 203 identifies the car occupant in the vehicle 2. As an example, the car occupant identification unit 203 may identify the car occupant by: storing, in association with each other, the car occupant and the identification number of the car occupant's cellular phone in advance; and reading the identification number from a cellular phone which has been brought into the vehicle 2, via a Bluetooth (trademark of U.S. Bluetooth SIG, INC.) interface. Furthermore, it is also possible to identify the car occupant through the reception, by the operation accepting unit 202, of a unique operation performed by the car occupant.

The requesting unit 204 issues the transmission request for the content, along with information which shows the identified car occupant, to the content server apparatus 10 via the communication I/F 205. The requesting unit 204 may perform the transmission request for the content in one or more of the following cases: when the on-vehicle player apparatus 20 is activated; when a content transmission directive operation by the user is received by the operation accepting unit 202; and when the timer unit 201 judges that a predetermined time has elapsed since the previous request.

In particular, performing the transmission request when the on-vehicle player apparatus 20 is activated is very convenient since before leaving home, for example, the on-vehicle player apparatus 20 is activated upon the start of the engine of the vehicle 2, and the obtainment of the content from the content server apparatus 10 is performed automatically.

The communication I/F 205 conducts wireless connection with the wireless LAN adapter 41, the wireless access point 51, and the base station 61 shown in FIG. 1, and communicates with the content server apparatus 10 via the household LAN 40, the Internet 50, and the mobile communication network 60. Specifically, the communication I/F 205 is a wireless communication apparatus which complies with a standard of a wireless LAN, a cellular phone system, and the like. All the communication with the content server apparatus 10, including the issuing of the transmission request, the reception of the content, and the authentication of the content server apparatus 10 to be described next, is conducted via the communication I/F 205.

The authenticating unit 206 authenticates the content server apparatus 10 before the reception of the aforementioned encrypted content. As an example, the authenticating unit 206, along with the authenticating unit 109 in the content server apparatus 10, may hold and mutually authenticate respective DTCP-based device certificate data.

The receiving unit 207 receives the encrypted content from the content server apparatus 10 via the communication I/F 205.

The storage medium 208 stores the received content. The storage medium 208 may be, for example, a hard disc apparatus, and may be a Digital Versatile Disc-Random Access Memory (DVD-RAM) and a Secure Digital (SD) card complying with to the CPRM standard.

In the unique information holding unit 211, the unique information of the on-vehicle player apparatus 20 has been preset and held. In the case where the storage medium 208 is compliant with the CPRM standard, a media key to the storage medium 208 can be used as the unique information. In that case, in the storage medium 208, a secret area where the media key is secretly held can be employed as the unique information holding unit 211.

When a reproduction request operation by the user is received by the operation accepting unit 202, the decrypting unit 209 reads out the content to be reproduced from the storage medium 208. In the case where the read-out content is a copyright-protected encrypted content, the decrypting unit 209 decrypts the encrypted content into a content in plaintext and outputs this to the decoding unit 210. A content originally in plaintext is outputted directly to the decoding unit 210. Moreover, the content which is outputted to the decoding unit is also outputted to the outside in the form of digital data such as a bitstream and the like.

The decoding unit 210 decodes the content outputted from the decrypting unit 209 and outputs an analog signal which can be reproduced on a speaker, a display apparatus, and the like which are not shown in the drawings. Note that when a reproduction apparatus, which can directly reproduce the digital data outputted from the decrypting unit 209, is connected outside, the decoding unit 210 can be omitted.

(System Operations)

Next, operations of the content server-player system in the embodiment are described.

Figure 5:
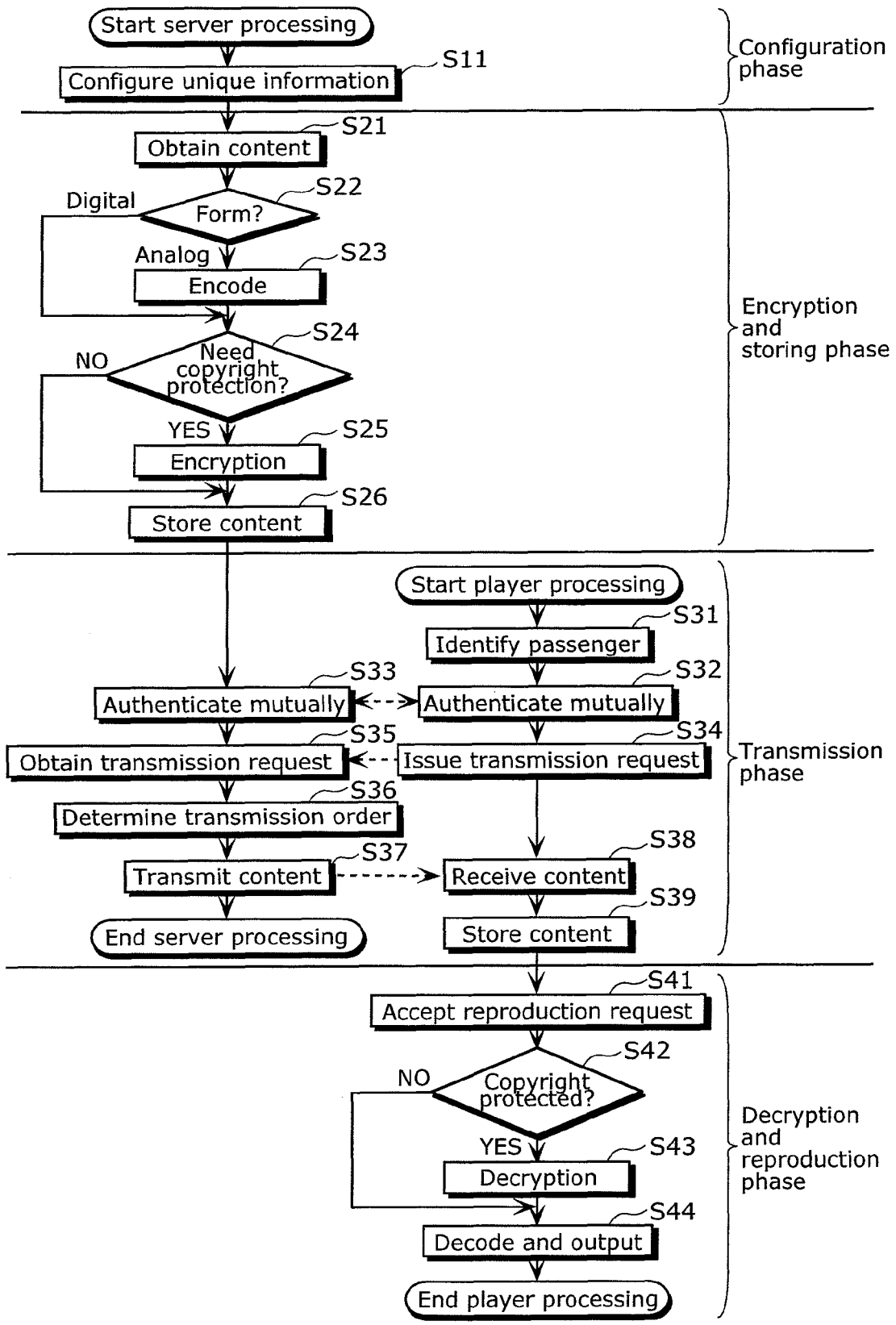
FIG. 5 is a flowchart which shows one example of an operation of the content server-player system.

FIG. 5 is a flowchart which shows an example of system operations. The flowchart shows four phases; namely, a configuration phase, an encryption and storing phase, a transmission phase, and a decryption and reproduction phase. Even though executable at independent timings, each phase is shown herein as one sequence, for the sake of simplification.

The configuration phase is executed, for example, at the shipment stage at the factory and the set-up stage at a retail outlet in the purchase of the content server 10 and the purchase or additional installation of the on-vehicle player apparatus 20.

In the configuration phase, the unique information of the on-vehicle player apparatus 20 is configured and held in the unique information holding unit 103 (S11).

The encryption and storing phase is executed prior to the transmission request from the on-vehicle player apparatus 20 when, for example: the recording of new content is notified from the recorder 30; periodical polling on the recorder 30 reveals that a new content has been recorded; or the user performs an encryption directive operation.

In the encryption and storing phase, the content obtaining unit 101 obtains the content in the form of an analog signal or digital data, from the recorder 30 (S21). When the content is obtained in the form of an analog signal (analog in S22), the encoding unit 102 encodes the analog signal into digital data (S23).

In the case where a copy controlling signal, which indicates the necessity of copyright-protection for the content, is included in the analog signal or the digital data (YES in S24), the encrypting unit 104 encrypts the content into an encrypted content, using the unique information held in the unique information holding unit 103 (S25).

The storing unit 105 stores the content in plaintext or the encrypted content (S26).

The transmission phase is executed, for example, one of when: the on-vehicle player apparatus 20 is activated; a content transmission directive operation by the user is accepted by the operation accepting unit 202; and the timer unit 201 indicates that the predetermined time has elapsed since the previous request.

In the transmission phase, the car occupant identification unit 203 identifies the car occupant (S31), and the authenticating unit 206 and the authenticating unit 109 perform mutual authentication (S32 and S33).

When the authentication is successfully performed, the requesting unit 204 issues the transmission request, including the information which indicates the identified car occupant, to the content server apparatus 10 via the communication I/F 205 (S34).

When the transmission request is obtained by the content server apparatus 10 (S35), the transmitting unit 107 refers to the details in the metadata storing unit 106 and determines the transmission order of the contents (S36), and transmits the contents to the on-vehicle player apparatus 20 in the determined order. The content of which transmission is successfully completed and the corresponding metadata are deleted (S37).

The receiving unit 207 receives the content which has been transmitted from the content server apparatus 10 (S38), and the storage medium 208 stores the received content (S39).

The decryption and reproduction phase is executed when, for example, the reproduction request operation performed by the user is received by the operation accepting unit 202.

When, in the decryption and reproduction phase, the reproduction request operation is accepted by the operation accepting unit 202, the decrypting unit 209 reads out the content requested for reproduction from the storage medium 208 (S41), and in the case where the content is a copyright-protected encrypted content (YES in S42), the content is decrypted into a content in plaintext (S43).

The decoding unit 210 decodes the content in plaintext and outputs an analog signal which can be reproduced on the speaker, the display apparatus, and the like which are not shown in the drawings (S44).

SUMMARY

As described above, according to the content server apparatus 10, the on-vehicle player apparatus 20, and the content server-player system configured thereof, the content server apparatus 10 encrypts a content using the unique information of the on-vehicle player apparatus 20 and stores the encrypted content, then transmits the stored encrypted content to the on-vehicle player apparatus 20.

By performing encryption and storing of the content prior to the transmission request for the content from the on-vehicle player apparatus 20, the content server apparatus 10 transmits the content which has already been encrypted when the transmission request is received, and therefore, overhead for encryption during transmission is eliminated, and turnaround time for the transmission process is shortened.

Moreover, by using the unique information of the on-vehicle player apparatus 20 for the aforementioned encryption, an encrypted content which cannot be reproduced on another player apparatus is obtained, so that acts for copying the encrypted content onto another player apparatus becomes irrelevant, contributing a level of copyright protection.

INDUSTRIAL APPLICABILITY

The content server apparatus, the on-vehicle player apparatus, and the content server-player system configured thereof in the present invention can be used in a system for providing contents to a player apparatus which is carried-on or equipped in a moving body, and are especially suitable for use in a car AV system.

The invention claimed is:

1. A content server apparatus used with an on-vehicle player apparatus, said content server apparatus comprising:
a storage device including a unique information holding unit which holds unique information of the on-vehicle player apparatus;
a content obtaining unit operable to obtain a content from outside of said content server;
a receiving unit operable to receive a transmission request from the on-vehicle player apparatus, the transmission request including (i) a request for content and (ii) information indicating a car occupant identified by the on-vehicle player apparatus;
an encrypting unit operable to encrypt the content obtained by said content obtaining unit into an encrypted content, using the unique information held in said unique information holding unit, prior to the transmission request from the on-vehicle player apparatus;
a storing unit operable to store the content encrypted by said encrypting unit;
a metadata storing unit operable to store metadata each corresponding to one of a plurality of encrypted contents stored in said storing unit, the metadata including information for identifying (i) a first person who previously recorded a first one of the plurality of encrypted contents, and (ii) a second person who previously recorded a second one of the plurality of encrypted contents, the second person being a different person than the first person; and
a transmitting unit operable to transmit, prior to any other encrypted content, an encrypted content to the on-vehicle player apparatus in response to the transmission request from the on-vehicle player apparatus, the encrypted content being included in the encrypted contents stored in said storing unit, and corresponding to metadata identifying the car occupant indicated by the transmission request as one of the first person who previously recorded the first one of the plurality of encrypted contents and the second person who previously recorded the second one of the plurality of encrypted contents,
wherein, for an encrypted content whose reproduction time exceeds a predetermined amount of time, (i) the encrypted content is divided into a plurality of fragments including at least a first fragment and a second fragment, (ii) the transmitting unit transmits the first fragment to the on-vehicle player apparatus before transmitting the second fragment to the on-vehicle player apparatus, and (iii) the first fragment is deleted from the storing unit after being transmitted by the transmitting unit to the on-vehicle player apparatus.

2. The content server apparatus according to claim 1, wherein the metadata stored in said metadata storing unit includes information for identifying two or more individuals.

3. The content server apparatus according to claim 1, wherein said transmitting unit is operable to delete, upon successful completion of transmission of the encrypted content, the encrypted content and the metadata corresponding to the encrypted content.

4. The content server apparatus according to claim 1, wherein the predetermined amount of time is one hour.

\* \* \* \* \*